United States Patent
Suzuki (10) Patent No.: US 6,191,775 B1
(45) Date of Patent: Feb. 20, 2001

(54) DATA INPUT APPARATUS

(75) Inventor: Katsutoshi Suzuki, Fukushima-ken (JP)

(73) Assignee: Alps Electric Co., Ltd., Tokyo (JP)

( * ) Notice: Under 35 U.S.C. 154(b), the term of this patent shall be extended for 0 days.

(21) Appl. No.: 09/119,814

(22) Filed: Jul. 21, 1998

(30) Foreign Application Priority Data

Jul. 24, 1997 (JP) .................................................. 9-198451

(51) Int. Cl.[7] .................................................. G09G 5/08
(52) U.S. Cl. .......................................... 345/167; 345/157
(58) Field of Search .................................. 345/157, 156, 345/158, 159, 160, 161, 163, 169, 168, 164, 165, 166, 167

(56) References Cited

U.S. PATENT DOCUMENTS

| | | | |
|---|---|---|---|
| 4,839,838 | * | 6/1989 | LaBiche et al. ...................... 345/157 |
| 5,491,497 | * | 2/1996 | Suzuki ................................. 345/157 |
| 5,729,249 | * | 3/1998 | Yasutake ............................. 345/157 |
| 5,874,941 | * | 2/1999 | Yamada ............................... 345/158 |
| 5,907,130 | * | 5/1999 | Suzuki ................................. 345/169 |
| 5,914,704 | * | 6/1999 | Yamada ............................... 345/157 |

* cited by examiner

*Primary Examiner*—Xiao Wu
(74) *Attorney, Agent, or Firm*—Brinks Hofer Gilson & Lione (57) ABSTRACT

There is provided a track ball type data input apparatus which can input data showing the movement in the direction vertical to the image or the rotation around the axis vertical to the image and visually and easily assures the operation flexibility in the threedimensional inputs. In this apparatus, the first encoder and the second encoder are driven by rotating the spherical manipulator called a track ball and the pulse outputs obtained from the encoders cause an object displayed in the image to move or rotate. When the attitude sensor detects inclination of the body case, the coordinate axes are rotated depending on the direction and angle of inclination and are then converted. Thereby the object can be moved or rotated with reference to the converted coordinate axes. Moreover, the moving operation control mode and rotating operation control mode can be switched by manipulating the mode switching button.

9 Claims, 5 Drawing Sheets

DATA INPUT APPARATUS

BACKGROUND OF THE INVENTION

1. Field of the Invention

The present invention relates to a data input apparatus for inputting coordinate data for moving or rotating an image displayed on the display screen of a computer system.

2. Description of the Related Art

Figure 5:
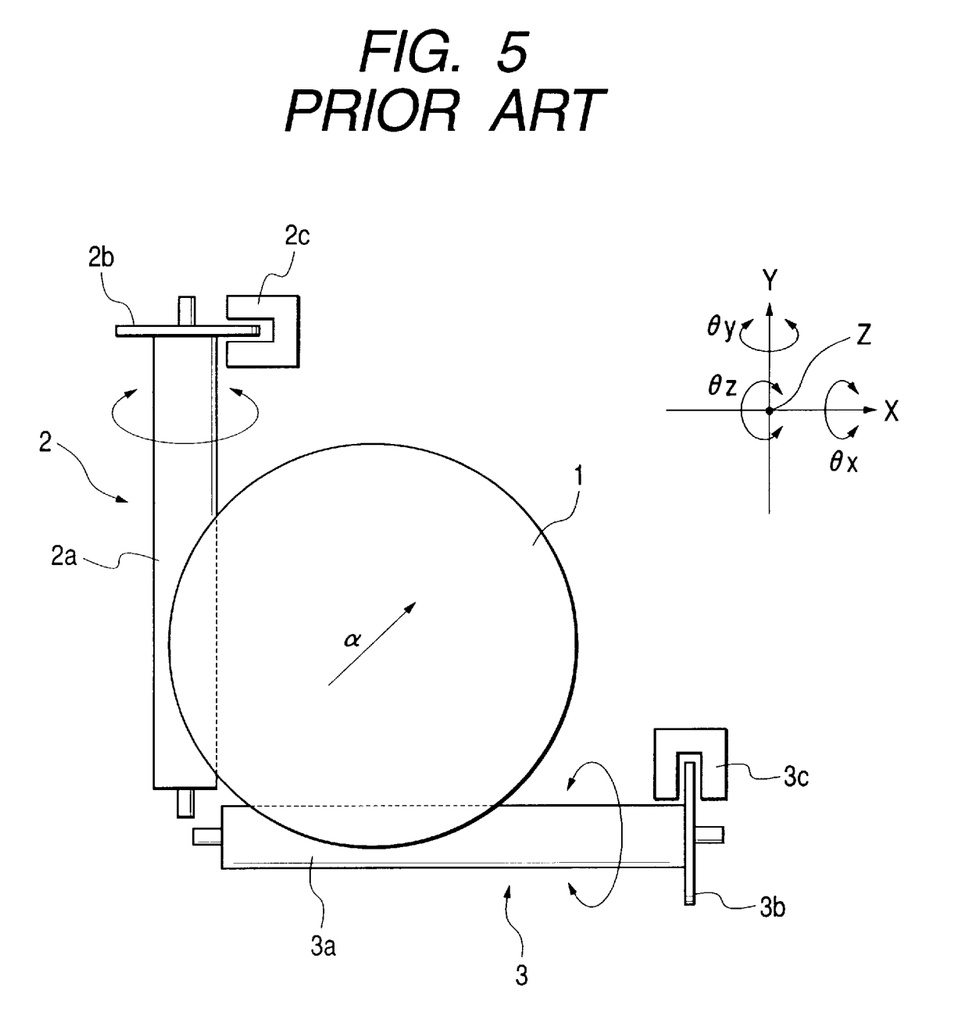
FIG. 5 is a plan view showing a schematic structure of the data input apparatus of the related art.

FIG. 5 is a plan view of a data input apparatus of the related art utilizing so-called a track ball.

A spherical manipulator 1 called a track ball is supported to freely rotate in the three-dimensional directions in order to drive an X encoder 2 and a Y encoder 3 in these directions.

The X encoder 2 comprises a roller 2a which rotates around the axis extending in the Y direction and a disc 2b which rotates together- with the roller 2a. At the external circumference of the disc 2b, cutout sections are formed. These cutout portions and the section where the cutout section is not formed are alternately formed in the circumference direction with a constant pitch At the external circumference section of the disc 2b, a photocoupler 2c is provided opposing thereto. The photocoupler 2c is provided with a light emitting element and a light receiving element opposed to each other and the external circumference of the disc 2b is provided between the light emitting element and light receiving element. When the roller 2a and disc 2b rotate, a pulse output of the frequency depending on the rotating velocity of the disc 2b can be obtained.

In the same manner, the Y encoder comprises a roller 3a rotating around the axis extending in the X direction, a disc 3b rotating together with this roller 3a, and a photocoupler 3c provided opposed to the external circumference of the disc 3b. At the external circumference of the disc 3b, the cutout portions and the section where the cutout section is not formed are formed alternately in the circumference direction in the constant pitch. Thereby, a pulse output in the frequency depending on the rotating velocity of the roller 3a and disc 3b can be obtained from the photocoupler 3c.

An ordinary input operation occurring when the data input apparatus explained above is connected to a computer will be explained below.

When the spherical manipulator 1 is rotated in the X direction, the roller 2a and disc 2b of the X encoder 2 rotate and thereby a pulse output can be obtained from the photocoupler 2c and it is then converted to the coordinate data. When this coordinate data is input to the computer, a cursor or character and object on the display image moves in the X direction, for example, on the display screen connected to the computer. Moreover, when the manipulator 1 is rotated in the Y direction, the roller 3a and disc 3b of the Y encoder 3 rotate, a pulse output from the photocoupler is converted to the coordinate data, and is then input. Thereby the cursor, etc. moves in the Y direction on the image explained above.

Moreover, when the manipulator 1 is rotated, for example, in the α direction having an angle for both X and Y axes, both roller 2a and roller 3a are rotated, the pulses from the photocoupler 2c and photocoupler 3c are converted into the coordinate data and thereby the cursor is moved in the α direction on the display image.

Moreover, it is also possible to input the data of rotating mode as the coordinate data by rotating the manipulator 1, for example, while the predetermined key on the keyboard is depressed. When the manipulator 1 is rotated in the X direction, for example, while depressing the key explained above and thereby the pulse output can be obtained from the photocoupler 2c of the X encoder, this pulse output is converted to the rotating data on the coordinate and is then input to the computer. As a result, a character or object, for example, displayed on the display image is rotated around the Y axis (θy direction). In the same manner, when the manipulator 1 is rotated in the Y direction while depressing the key, the character explained above rotates, for example, around the X axis (θx direction) on the display image.

Namely, the character, etc. on the display image rotates in the same direction as the manipulator 1. Therefore, when the manipulator 1 is rotated in the α direction, the character, etc. rotates around the axis orthogonal to the α direction.

As explained above, in the data input apparatus comprising the spherical manipulator 1, X encoder 2 and Y encoder 3, the coordinate data of the moving direction, amount of movement and moving velocity in the two-dimension of the X-Y coordinates can be input and moreover the rotating data around the Y axis and the rotating data around the X axis can also be input in the input mode of the rotating coordinate. However, the input coordinate data is limited only to that explained above and it is a disadvantage of the related art that it is impossible to execute the following input.

(1) When inputting the rotating data on the coordinate, the rotating data around the Z axis orthogonal to the X and Y axes cannot be input. Namely, as explained above, when the manipulator 1 is rotated in the X direction or in the Y direction in the rotating mode where the predetermined key is depressed, it is possible to input the data to rotate the character in the same direction as the manipulator 1 on the display image. However, even when the manipulator 1 is rotated in the θz direction (rotation around the X axis) in FIG. 5, the rotating data around the Z axis cannot be input. Namely, if the manipulator 1 rotates in the θz direction, the X encoder 2 and Y encoder 3 rotate due to the elements around the X axis and Y axis of the manipulator 1 during this rotation and the character tries to rotate only around the X axis and Y axis depending on such output pulse.

(2) In the input apparatus shown in FIG. 5, the moving data in the Z axis direction cannot be input. Therefore, it is impossible to input the data for moving, for example, the character and object appearing on the display image in different directions such as X axis and Y axis directions.

(3) As explained above, in the data input apparatus of the related art, it is possible to input the coordinate data with reference to the X-Y coordinates forming the orthogonal coordinates on the horizontal plane where this data input apparatus is installed, but it is impossible to input the data in the coordinates with reference to the Y-Z plane other than the X-Y plane and moreover to input the data to the coordinates on the plane inclining against the X-Y plane.

(4) In the data input apparatus of the two-dimensional input type as shown in FIG. 5, when the X encoder 2 is rotated depending on the operation of the manipulator 1, an object M on the display image (refer to the coordinates in the image of FIG. 2) moves in the X axis direction and when the Y encoder 3 is rotated, the object M on the image moves in the Y axis direction. In this case, regarding the X axis direction, the rotating direction of the manipulator 1 visually matches the moving direction of the object M on the display image but regarding the Y axis direction, although the manipulator 1 is actually moving in the Y axis direction, the moving direction of the object M moves in the vertical direction of the image, namely in the Z axis direction and therefore visual matching of the movement cannot be obtained. Therefore, when inputting the three-dimensional data in the X-Y-Z coordinates by improving the data input apparatus of this type, it is assumed that correspondence between operation and rotation in the direction of axis or around the axis may be confused.

OBJECT AND SUMMARY OF THE INVENTION

The present invention has been proposed to solve the problems of the related art and it is therefore an object of the present invention to provide a data input apparatus which can input not only the moving data or rotating data on the X-Y coordinates to an image displayed on a computer but also the moving data or rotating data with reference to the coordinates orthogonal to the X-Y coordinates or the coordinates inclining against the X-Y coordinates.

Moreover, it is also an object of the present invention to provide a data input apparatus which matches the moving direction of the object on the display image with the moving direction of the manipulator to assure the excellent visual effect and also realizes good flexibility in operation.

The data input apparatus of the present invention is characterized in providing a body case which may be held by hand, a manipulator which is provided to the body case and may be manipulated by hand, an encoder for outputting a manipulation signal depending on manipulation of the manipulator, a sensor for detecting inclination of the manipulator, and a coordinate data producing means for converting the manipulation signal from the encoder to the moving data or rotating data on the coordinate axis inclined depending on the inclination angle of the body case on the basis of the inclination detecting signal of the body case by the sensor.

In the present invention, when the manipulator is operated, the sensor provided in the body case detects inclination of the body case. With detection of inclination, an output from the encoder is converted to the moving data or rotating data on the coordinate axes with reference to such inclination angle and is then supplied to an image processing section. As a result, an image can be moved or rotated on the coordinates on the display of the computer.

The sensor may be a mercury sensor, for example, which can detect the attitude of the body case in the two stages of the horizontal attitude and vertical attitude. In this case, the moving data and rotating data for the coordinate axes which are crossing with each other in orthogonal on the display image can be input depending on the horizontal or vertical attitude of the body case. Alternatively, it is also possible to input the moving data or rotating data for the coordinate axes including inclination angles depending on each attitude of the body case by using a sensor which can detect step by step or continuously the inclination angle of the body case.

In the above explanation, it is preferable that an encoder for outputting a manipulation signal around two axes crossing in orthogonal with manipulation of the manipulator is provided and the moving data or rotating data on the orthogonal coordinate axes inclined against the inclination angle of the body case is produced in the coordinate data producing means. In this case, the manipulator is formed, for example, in the spherical shape and the encoder which outputs the manipulation signal around two axes may be operated depending on the rotation of the manipulator.

However, it is also allowed that the manipulator is provided with a roller type manipulator which rotates around the axes which are crossing in orthogonal with each other and the encoder is respectively operated by this manipulator. Alternatively, it is also possible that the manipulator is provided with a single manipulator which rotates for the axis in one direction and an encoder to be manipulated with this single manipulator and the moving data as well as rotating data are input to various directions depending on inclination of the body case with the single manipulator in accordance with inclination of the body case.

Moreover, the body case can also be provided with a switching device for selecting the data produced by the coordinate data producing means as either the moving data or the rotating data.

When inputting the coordinate data, manipulation can be switched for inputting the data as the moving data for moving the object on the display image or inputting as the rotating data for rotating the object on the display image around the predetermined axis by manipulating the switching device with the hand holding the body case when the manipulation signal is output from a certain encoder. Moreover, even when the body case is not provided with the switching device, the moving data and rotating data can be switched by manipulating the predetermined key on the keyboard.

In addition, in the present invention, it is preferable that the encoder and the sensor are provided on the side of the body case which may be held by hand and the coordinate data producing means is provided on the side of the computer for data processing. In this case, the body case and the computer are connected with a cord or a cordless connecting means utilizing the infrared beam or electromagnetic wave.

However, it is also allowed that the encoder, sensor and coordinate data producing means are all mounted in the side of the body case which may be held and carried by hand.

BRIEF DESCRIPTION OF THE DRAWINGS

Other objects and advantages of the present invention will be apparent from the following detailed description of the presently preferred embodiments thereof, which description should be considered in conjunction with the accompanying drawings in which.

DESCRIPTION OF THE PREFERRED EMBODIMENTS

Figure 1:
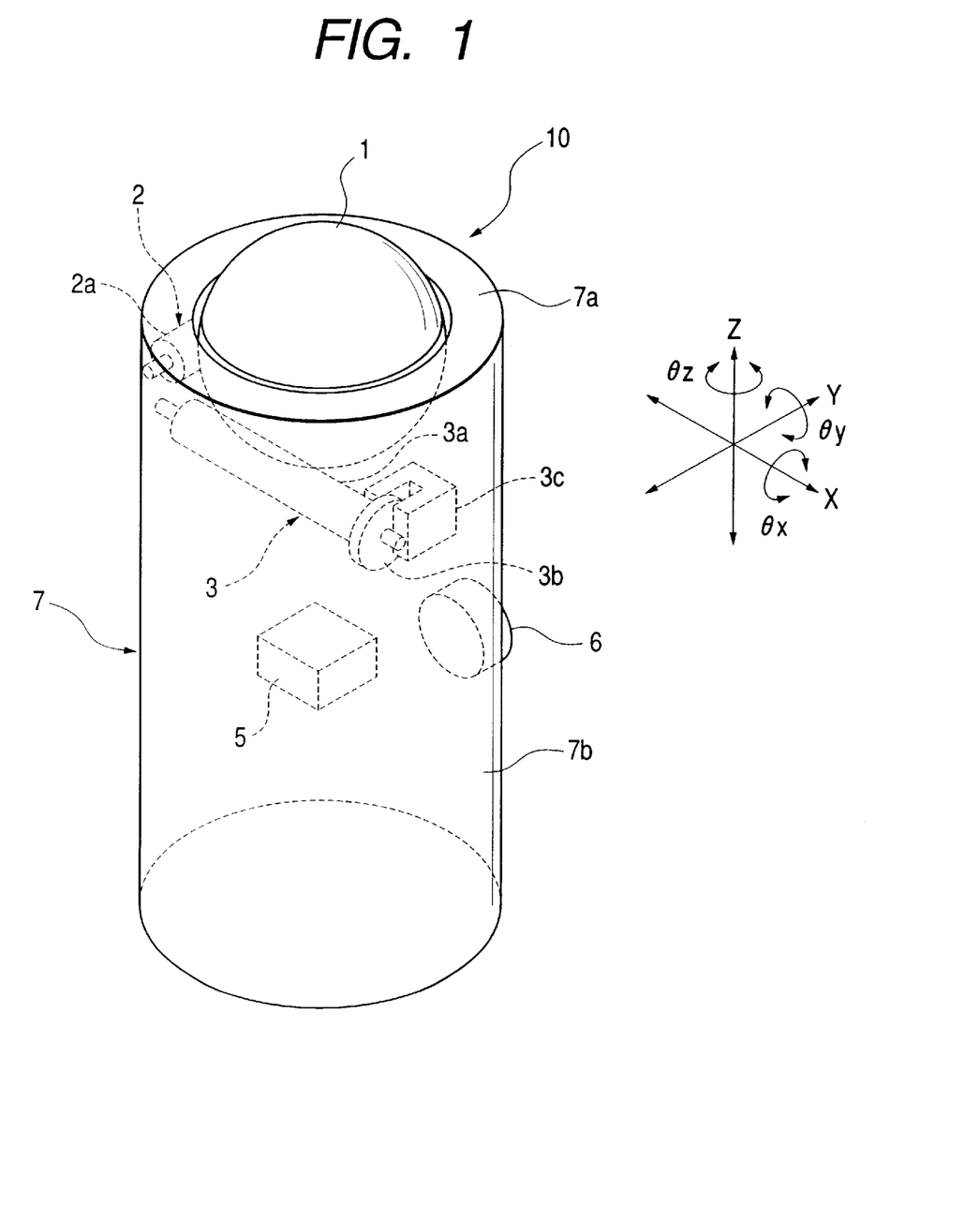
FIG. 1 is a perspective view showing a data input apparatus of the present invention.
Figure 2:
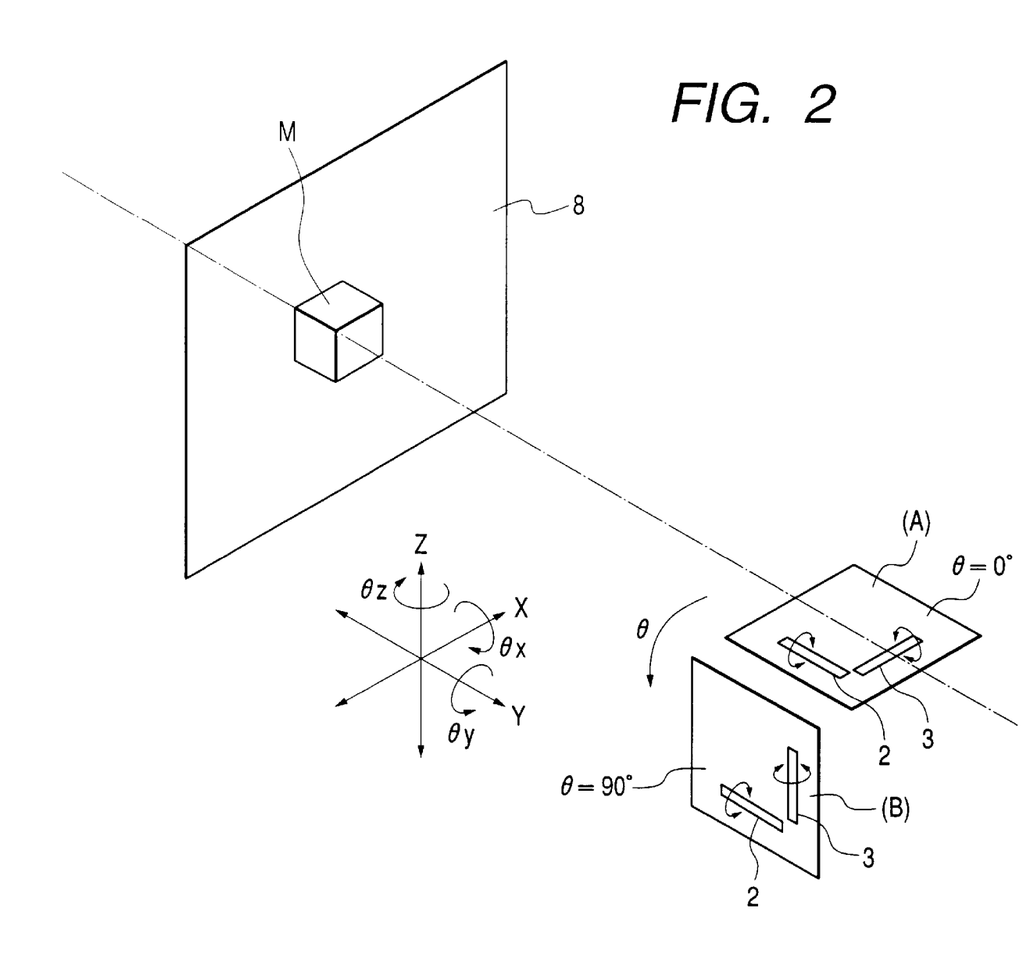
FIG. 2 is a diagram showing the application condition of a data input apparatus and the relationship between the display image and coordinate of the display.
Figure 3:
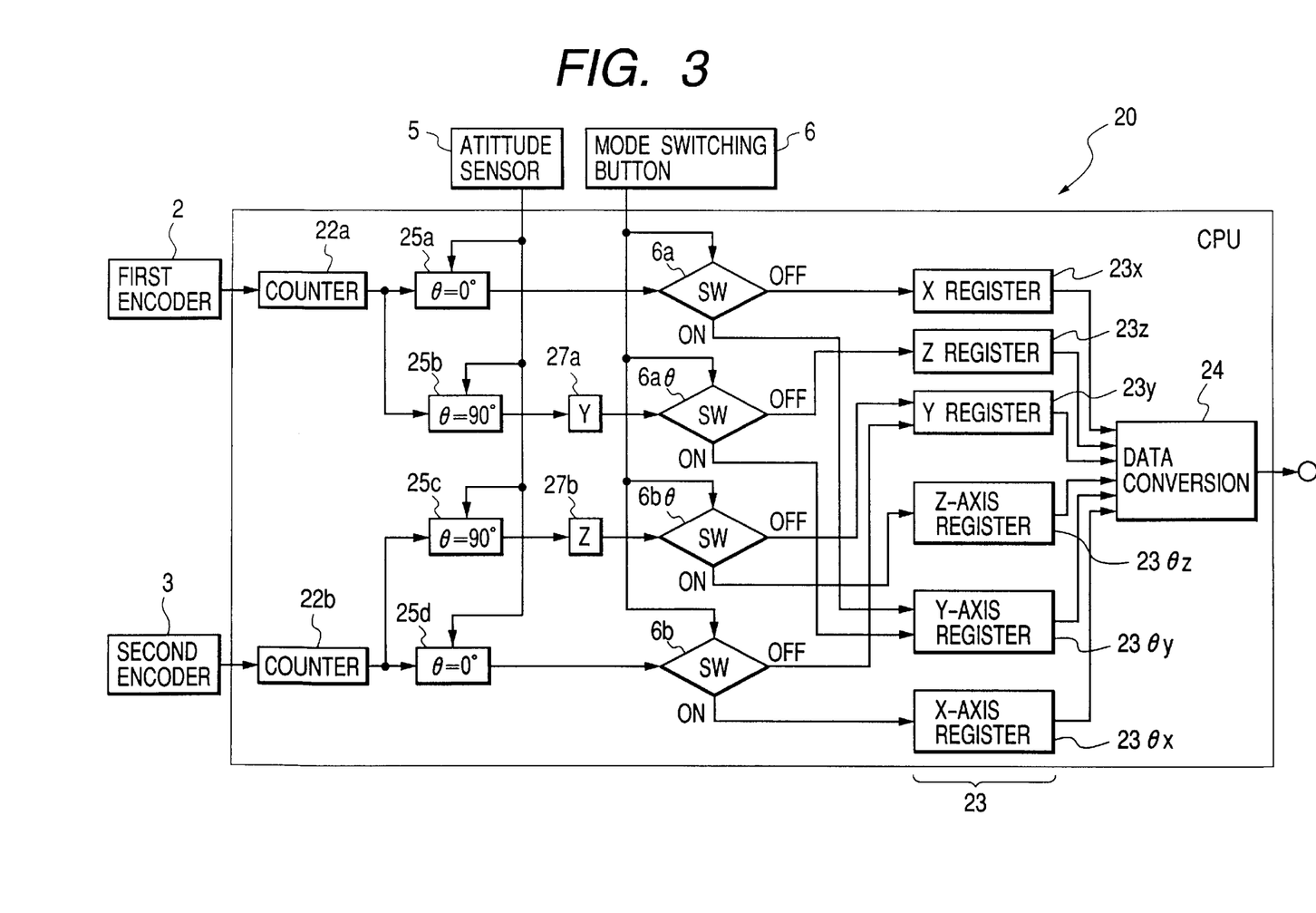
FIG. 3 is a diagram showing a circuit structure as an example of the circuit structure.
Figure 4:
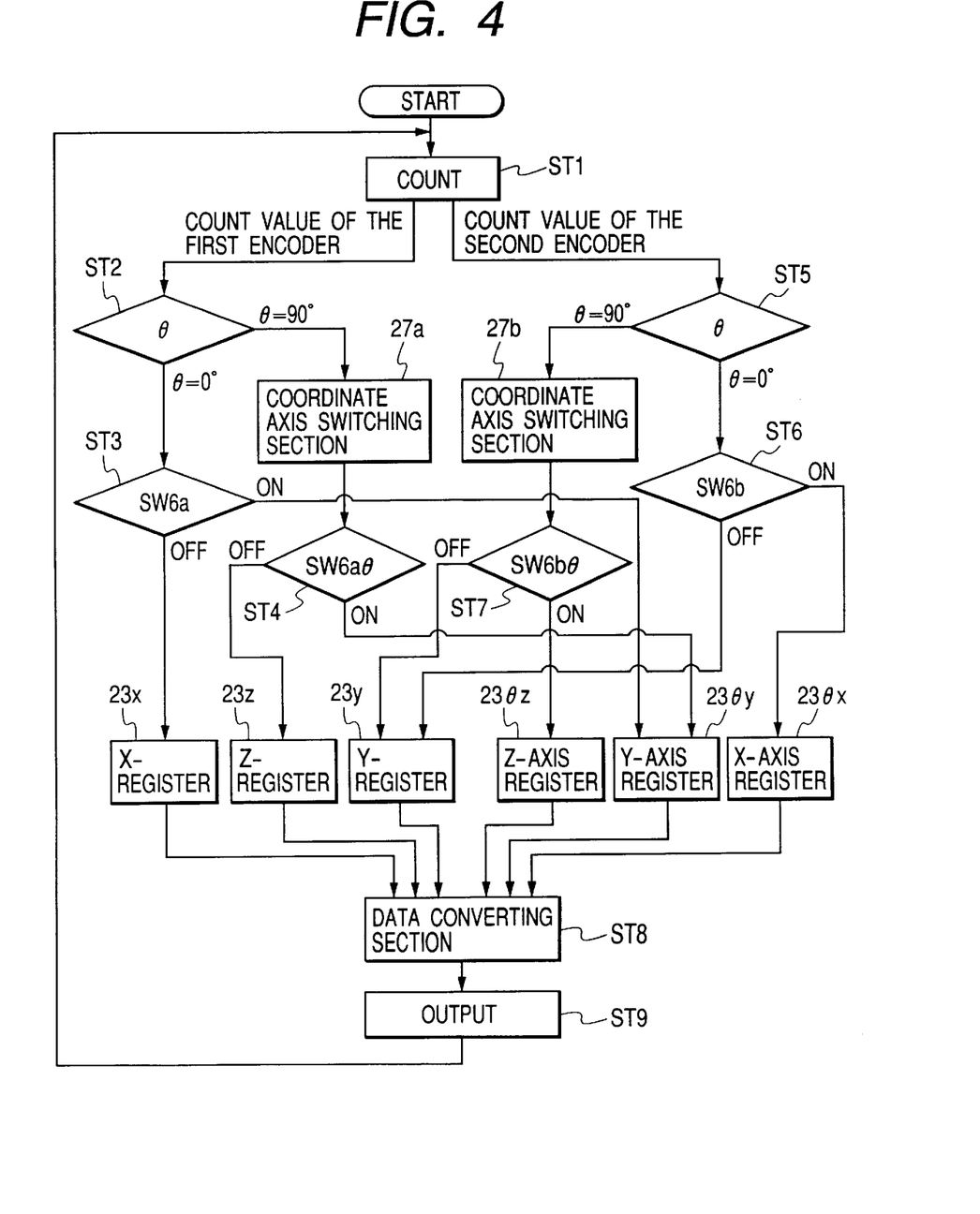
FIG. 4 is an operation flowchart.

FIG. 1 is a perspective view showing an data input apparatus of the present invention. FIG. 2 is a perspective view showing the relationship between coordinates of encoder and coordinates of display image. FIG. 3 is a circuit structure diagram of the data input apparatus. FIG. 4 is a flowchart showing input operations of data.

An arrangement direction of a controller 10 shown in FIG. 1 and FIG. 2 and the image processing coordinate on the display image of display 8 are indicated using the common orthogonal coordinate axes (X-Y-Z coordinate axes) preset on the space.

The reference numeral 7 of FIG. 1 designates a body case of the controller 10 in relation to the data input apparatus of the present invention. This body case 7 is formed like a column in such a size as can be held in a hand. The spherical manipulator 1 called a track ball is supported at the upper part 7a of the body case 7 to freely rotate around the X axis, Y axis and combining direction of these axes. Moreover, a small size mode switching button 6 is provided as the switching device at the side surface 7b of the body case 7. Therefore, an image on the display screen can be switched to the rotating operation around each axis from the moving operation to each axis by depressing this mode switching button 6.

The spherical equatorial line of the manipulator 1 is located in the lower side of the upper part 7a of the body case 7. When the manipulator 1 is rotated with a finger, the figure is in contact with the manipulator at the upper part of the equatorial line.

The controller 10 explained above is provided with an encoder as in the case of the related art shown FIG. 5, namely a first encoder 2 and a second encoder 3. The first encoder 2 is formed of a roller 2a, a disc 2b in which the cutout sections are formed at the external circumference in the constant pitch, and a photocoupler 2c provided opposed to the external circumference of the disc 2b (the disc 2b and photocoupler 2c cannot be observed in FIG. 1). Meanwhile, the second encoder 3 is also formed of a roller 3a, a disc 3b in which the cutout section is formed at the external circumference in the constant pitch, and a photocoupler 3c. The roller 2a of the first encoder and the roller 3a of the second encoder 3 are provided orthogonal with each other.

When the spherical manipulator 1 is rotated by a finger, the roller 2a and/or roller 3a is also rotated by the manipulator 1 and thereby a pulse output of the frequency depending on the rotating velocity can be obtained from the photocoupler 2c and/or photocoupler 3c. Moreover, the photocoupler 2c and photocoupler 3c are also provided respectively with two pairs of a light emitting element and a light receiving element to detect the cutout sections. The first pair of the light emitting element and the light receiving element and the second pair of the light emitting element and the light receiving element are deviated in the phase for detecting the cutout sections in view of detecting the rotating directions of the rollers 2a, 3a. In addition, the pulse output of the frequency depending on the rotating velocity of the rollers 2a, 3a can be obtained from the photocouplers 2c and 3c.

Within the body case 7 of the controller 10, an attitude sensor 5 is arranged to detect inclination of the body case 7. The attitude sensor 5 is provided with a mercury switch which is filled with mercury to detect the inclination depending on the direction and acceleration of the movement of mercury.

FIG. 2 shows the arrangement relationship between the arrangement condition of the first encoder 2 and second encoder 3 within the controller 10 and display image of the display 8 when the controller 10 is set in the attitude where the first encoder 2 is directed to the Y direction while the second encoder 3 is directed to the X direction and in the attitude rotated by 90 degrees around the Y axis from such horizontal attitude.

Usually, the condition where the controller 10 is held by hand is shown in FIG. 2(A). In this case, in regard to the first encoder 2, the object M on the image can be moved in the X axis direction by rotating the manipulator 1 around the Y axis. Moreover, the object M can be rotated around the Y axis (in the $\theta y$ direction) by depressing the button 6 to switch to the rotation mode. Moreover, in regard to the second encoder 3, the object M on the display image can be moved in the Y axis direction by rotating the manipulator 1 around the X axis and the object M can be rotated around the X axis (in the $\theta x$ direction) by rotating the manipulator 1 in the Y axis direction while the button 6 is being depressed.

In addition, when the manipulator 1 is rotated in the direction crossing both X axis and Y axis, the object M may be moved or rotated in the composite direction with an output of the first encoder 2 and an output of the second encoder 3.

Next, the controller 10 is inclined for 90 degrees from the condition explained above to obtain the condition of FIG. 2(B).

In this case, the attitude sensor 5 provided within the controller 10 detects an inclination to convert the coordinates. Namely, the first encoder 2 controlling movement in the X axis direction and rotation in the $\theta y$ direction is switched to the encoder for controlling the movement in the Z axis direction and rotation around the Y axis (rotation in the $\theta y$ direction). Moreover, the second encoder 3 controlling the movement in the Y axis direction and rotation in the $\theta x$ direction is switched to the encoder for controlling the movement in the Y axis direction and rotation around the Z axis ($\theta z$ direction).

Next, the circuit structure shown in FIG. 3 will be explained.

In this embodiment, the pulse waveforms from the first encoder and second encoder are shaped and are then input directly to CPU 20 on the computer side.

Each signal input to CPU 20 in the computer side is processed on the basis of the preset software but its process is replaced with the circuit structure in FIG. 3. Therefore, it is also possible to form the circuit shown in the block diagram of FIG. 3 on the substrate.

In the circuit block diagram shown in FIG. 3, inclination of the controller 10 detected by the attitude sensor 5 is limited only to 0 degree ((A) in FIG. 2) and 90 degrees ((B) in FIG. 2). Here, it is also possible to detect the attitude in a plurality of stages in the range from 0 to 90 degrees. In this case, only the number of $\theta$ switching sections 25a to 25d increases and the basic circuit structure and processing operation are same as those in FIG. 3 and FIG. 4.

A pulse output from the photocoupler 2c of the first encoder 2 is counted up by a counter 22a to measure the amount of rotation and rotating velocity of the spherical manipulator 1. When the attitude of the body case 7 is 0 degree ($\theta=0$), the $\theta$ switching section 25a opens and $\theta$ switching section 25b closes depending on the detection signal of the attitude sensor 5. Thereby the pulse from the first encoder 2 is recognized as the manipulation signal around the X axis. When the body case 7 is inclined for 90 degrees ($\theta=90$) as shown in FIG. 2, the $\theta$ switching section 25a closes and the $\theta$ switching section 25b opens depending on the detection signal from the attitude sensor 5. Thereby the pulse from the first encoder 2 is applied to the coordinate axis switching section 27a and is then recognized as the manipulation signal around the Z axis.

FIG. 3 shows the switch sections 6a, 6a$\theta$, 6b$\theta$, 6b for switching the path of the pulse depending on the ON or OFF state of the mode switching button 6.

When the body case 7 is maintained in the horizontal attitude ($\theta=0$) and the mode switching button 6 is in the OFF state, the manipulation signal (pulse) from the $\theta$ switching section 25a is applied to the X register 23x from the switching section 6a and the pulse output is converted to the moving data in the X axis direction by the data converting section 24. Moreover, when the mode switching button 6 is in the ON state, the manipulation signal from the θ switching section 25a is sent to the Y axis register 23θy from the switching section 6a and is then converted to the Y axis rotating data by the data converting section 24.

When the body case 7 is in the attitude inclined by 90 degrees (θ=90) and the mode switching button 6 is in the OFF state, the manipulation signal obtained from the coordinate axis switching section 27a is given to the Z register 23z from the switching section 6aθ and is then converted to the moving data in the Z axis direction by the data converting section 24. When the mode switching button 6 is in the ON state, the manipulation signal obtained from the coordinate axis switching section 27a is given to the Y axis register 23θy from the switching section 6aθ and is then converted to the Y axis rotating data by the data converting section 24.

Next, the second encoder 3 will be explained.

When the manipulator 1 is rotated, the pulse output from the photocoupler 3c of the second encoder 3 is counted up by the counter 22b as the manipulation signal. When the body case 7 is detected to be in the horizontal attitude (θ=0) by the attitude sensor 5, the θ switching section 25c closes and the θ switching section 25d opens. Thereby, the second encoder 3 is recognized to be manipulated around the X axis. When the body case 90 is detected to be rotated for 90 degrees by the attitude sensor 5, the θ switching section 25c opens and the θ switching section 25d closes. Thereby, the manipulation signal from the counter 22b is given to the coordinate axis switching section 27b. Accordingly, the second encoder 3 is recognized to be manipulated around the Z axis.

When the mode switching button 6 is in the OFF state while the body case is in the horizontal attitude (θ=0), the manipulation signal is switched to the switching section 6b from the θ switching section 25d and is then given to the Y register 23y and is thereafter converted to the moving data in the Y axis direction by the data converting section 24. Moreover, when the mode switching button 6 is in the ON state, the manipulation signal is given to the X axis register 23θx by the switching section 6b and is then converted to the X axis rotating data by the data converting section 24.

When the body case 7 is rotated for 90 degrees (θ=90), the manipulation signal from the coordinate axis switching section 27b is given, while the mode switching button 6 is in the OFF state, to the Y register 23y from the switching section 6bθ and is then converted to the moving data in the Y axis direction by the data converting section 24. Moreover, when the mode switching button 6 is in the ON state, the manipulation signal is given to the Z axis register 23θz by the switching section 6bθ and is then converted to the Z axis rotating data by the data converting section 24.

As explained above, in the present invention, the encoders 2, 3 and attitude sensor 5 are provided in the side of the body case 7, while the coordinate data producing section to produce the moving data and rotating data with the coordinate data producing means, namely, the register group 23 and data converting section 24 is structured on the side of the computer for processing the data from viewpoint of the software.

Next, operations of the data input apparatus will then be explained with reference to the flowchart shown in FIG. 4.

When the spherical manipulator 1 is rotated in any direction of the X axis or Y axis direction, only the roller 2a of the first encoder 2 rotates or only the roller 3a of the second encoder 3 rotates. Otherwise, both rollers 2a, 3a rotate.

The manipulation signal obtained by counting up the pulses from the first encoder 2 with the counter 22a is switched by the θ switching sections 25a, 25b depending on inclination attitude of the body case 7. Here, when θ=0 degree (refer to (A) of FIG. 2), the manipulation signal (pulse output) is given to the switching section 6a in the step 3 (ST3). When the mode changeover switch 6 is in the OFF state, the manipulation signal is given to the X register 23x and the signal is output as the moving data in the X axis direction from the data converting section (ST8) and is then input to the image processing section of the computer. Moreover, when the switching section 6a in the step 3 is in the ON state, the manipulation signal is sent to the Y axis register 23θy and is then output as the Y axis rotating data from the data converting section ST8.

When θ=90 degree in the step 2 (ST2), the coordinate axis is recognized to be rotated by 90 degrees by the coordiante axis switching section 27a. Namely, as shown in FIG. 2, the first encoder 2 is converted to provide the moving data in the Z axis direction and the rotating data around the Y axis. Next, the manipulation signal is sent to the switching section 6aθ in the step 4. Here, if the mode switching button 6 is in the OFF state, the signal is sent to the Z register 23z, converted to the moving data in the Z axis direction in the step 8 (ST8) and is then output. Meanwhile, if the mode switching button 6 is in the ON state, the signal is given to the Y axis register 23θy and is then output as the rotating data around the Y axis.

Next, the pulse output (ST1) from the second encoder 3 is sent to the θ switching sections 25c, 25d to be switched by the attitude sensor 5 to change over the signal path. When θ=0 degree in the step 5, the pulse output is sent to the switching section 6b in the step 6 (ST6). Here, when the mode switching button 6 is in the ON state, the signal is then sent to the X axis register 23θx and is then output as the rotating data around the X axis. Moreover, when the switch is in the OFF state in the step 6, the pulse output is given to the Y register 23y and is output as the moving data in the Y axis direction.

Moreover, when the manipulator 1 of the controller 10 is inclined to turn to one side, the attitude sensor 5 detects this inclination. As a result, the manipulation signal from the counter 22b is given to the coordinate axis switching section 27b. The controller 10 controls the coordinate axis switching section 27b to change the operation to execute the processing of the moving data in the Y axis direction and rotating data around the Z axis from the operation to execute the processing of the moving data in the Y axis direction and rotating data around the X axis. Namely, when the mode switching button 6 is set to the ON state, the manipulation signal is sent to the Z axis register 23θz and is then output as the rotating data around the Z axis. When the switch is in the OFF state in the step 7 (ST7), the manipulation signal is sent to the Y register 23y and is then output as the moving coordinate data in the Y axis direction.

As explained above, when the manipulator 1 is rotated in the X axis direction under the condition that the manipulator 1 of the controller 10 is directed upward (condition (A)), the object M on the display image on the display 8 moves in the X axis direction. While, the rotating mode is being set, the object M rotates around the Y axis (θy direction). Moreover, when the manipulator 1 is rotated in the Y axis direction, the object M moves in the Y axis direction. In addition, when the rotating mode is being set, the object M rotates around the X axis (θx direction).

In the same manner, when the manipulator 1 is rotated in the Z axis direction under the condition that the manipulator 1 of the controller 10 is turned to one side (condition (B)), the object M on the display image on the display 8 moves in the Z axis and when the rotating mode is being set, the object M rotates around the Y axis (θy direction). Moreover, when the manipulator 1 is rotated in the Y axis direction, the object M moves in the Y axis direction and when the rotating mode is being set, the object M rotates around the Z axis (θz direction).

As explained above, facilities are provided so that the manual rotating manipulation of the manipulator 1 is visually matched with the moving operation and rotating operation of the object M on the display image.

The data input apparatus of the present invention is not limited to the above embodiments. For example, inclination angle of the controller 10 is set to 0 and 90 degrees, but an object on the display image can also be moved and rotated in more detail by continuously setting the inclination minutely without steps to realize the processing in the computer.

Moreover, the coordinate data producing section is usually provided on the computer side for the processing by software, but it is also possible to provide the coordinate data producing section on the body case side.

In addition, the shape of the manipulator 1 is also not limited to the spherical shape called a track ball and can be changed and modified in various shapes such as touch pad type or stick type without departing from the scope of the appended claims.

The data input apparatus of the present invention obtained as explained above is capable of inputting the moving data and rotating data on the coordinate data in different angles by changing the attitude of the body case provided with the manipulator. In addition, the manipulating direction of the manipulator of the body case being held by hand can be matched with the moving direction and rotating direction on the display image.

Further, the manipulator and switching device can be manipulated with the same hand by providing the switching device for switching the moving mode and operating mode to the body case.

What is claimed is:

1. A data input apparatus comprising:
   a body case that can be held and inclined by hand;
   a ball that is provided on said body case and can be manipulated by hand;
   a pair of encoders for outputting two-axes manipulation signals depending on a manipulation of said ball;
   sensor for detecting an inclination of said body case;
   and a coordinate data producing means for converting the two-axes manipulation signals from said pair of encoders to a three-axes moving data on a coordinate axes inclined corresponding to an inclination direction of the body case or a three-axes rotating data on said coordinate axes on the basis of a body case inclination detecting signal from said sensor.

2. The data input apparatus according to claim 1, wherein said pair of encoders are provided for outputting said two-axes manipulation signals around two-axes, crossing in orthogonal with each other, depending on manipulation of the ball and said coordinate data producing means produces the moving data or rotating data on the orthogonal coordinates inclined corresponding to the inclination direction of the body case.

3. The data input apparatus according to claim 2 wherein said ball is formed in the spherical shape and said pair of encoders are operated to output the two-axes manipulation signals around said two axes depending on rotation of said ball.

4. The data input apparatus according to claim 1, wherein said body case is provided with a switching device for selecting either the three-axes moving data or the three-axes rotating data from the data produced by said coordinate data producing means.

5. The data input apparatus according to claim 1, wherein said pair of encoders and said sensor are provided on the body case side which can be held by hand and said coordinate data producing means is provided on a computer side for arithmetic operation of data.

6. The data input apparatus according to claim 1, wherein said body case is in a column shape that can be held and inclined by a hand, and said ball is moveably located on the top side of said body case.

7. The data input apparatus according to claim 4, wherein said three-axes moving data is selected when said switching device is in "OFF" position, and said three-axes rotating data is selected when said switching device is in "ON" position.

8. The data input apparatus according to claim 1, wherein each of said pair of encoders includes a roller, a disc, and a photocoupler.

9. The data input apparatus according to claim 1, wherein said sensor is provided with a mercury switch which is filled with mercury to detect said inclination direction depending on a direction and acceleration of a movement of said mercury.

* * * * *

UNITED STATES PATENT AND TRADEMARK OFFICE
CERTIFICATE OF CORRECTION

PATENT NO. : 6,191,775 B1　　　　　　　　　　　　　　　　　　　Page 1 of 1
DATED : February 20, 2001
INVENTOR(S) : Katsutoshi Suzuki et al.

It is certified that error appears in the above-identified patent and that said Letters Patent is hereby corrected as shown below:

<u>Title page,</u>
ABSTRACT,
Line 5, delete "threedimensional" and substitute -- three dimensional -- in its place.

<u>Claim 3,</u>
Line 1, immediately after "claim 2" insert -- , -- (comma).

Signed and Sealed this

Twenty-sixth Day of March, 2002

*Attest:*

*Attesting Officer*

JAMES E. ROGAN
*Director of the United States Patent and Trademark Office*